(12) United States Patent
Golitschek Edler Von Elbwart et al.

(10) Patent No.: US 8,160,175 B2
(45) Date of Patent: Apr. 17, 2012

(54) QUASI-PILOT SYMBOL SUBSTITUTION

(75) Inventors: Alexander Golitschek Edler Von Elbwart, Darmstadt (DE); Isamu Yoshii, Frankfurt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 1108 days.

(21) Appl. No.: 11/817,398

(22) PCT Filed: Mar. 29, 2005

(86) PCT No.: PCT/EP2005/003262
§ 371 (c)(1),
(2), (4) Date: Nov. 15, 2007

(87) PCT Pub. No.: WO2006/102909
PCT Pub. Date: Oct. 5, 2006

(65) Prior Publication Data
US 2008/0151989 A1    Jun. 26, 2008

(51) Int. Cl.
*H04L 27/00* (2006.01)
(52) U.S. Cl. ........ 375/295; 375/130; 375/135; 375/136; 375/146; 375/147; 375/260; 375/267; 375/316; 375/329; 375/343; 375/350
(58) Field of Classification Search .................. 375/295, 375/260, 267, 316, 329, 343, 350; 370/203, 370/204, 208, 337, 465
See application file for complete search history.

(56) References Cited

U.S. PATENT DOCUMENTS

| | | | | |
|---|---|---|---|---|
| 5,852,630 | A  * | 12/1998 | Langberg et al. | 375/219 |
| 5,878,085 | A    | 3/1999  | McCallister et al. | |
| 6,888,789 | B1   | 5/2005  | Sakoda et al. | |
| 6,888,804 | B1 * | 5/2005  | Moon | 370/311 |
| 7,079,574 | B2 * | 7/2006  | Rafie et al. | 375/232 |
| 7,630,465 | B2 * | 12/2009 | Nieto | 375/350 |
| 2003/0039322 | A1 * | 2/2003 | Murakami et al. | 375/329 |
| 2004/0128605 | A1   | 7/2004 | Sibecas et al. | |
| 2004/0131007 | A1 * | 7/2004 | Smee et al. | 370/208 |

FOREIGN PATENT DOCUMENTS

| | | |
|---|---|---|
| EP | 1083719 | 3/2001 |
| EP | 1284565 | 2/2003 |
| JP | 2004-207995 | 7/2004 |
| JP | 2005-073303 | 3/2005 |
| WO | 9909720 | 2/1999 |
| WO | 0076109 | 12/2000 |

OTHER PUBLICATIONS

PCT International Search Report dated Nov. 9, 2005.
Lutz H.-J. Lampe, et al. "Iterative Decision-Feedback Differential Demodulation of Bit-Interleaved Coded MDPSK for Flat Rayleigh Fading Channels," IEEE Transactions on Communications, vol. 49, No. 7, pp. 1176-1184, Jul. 2001.

(Continued)

*Primary Examiner* — Dhaval Patel
(74) *Attorney, Agent, or Firm* — Dickinson Wright PLLC

(57) ABSTRACT

To improve the reliability of channel estimation, data symbols at determined positions of the transmitted data stream are replaced by quasi-pilot symbols. The quasi-pilot symbols carry data modulated onto the carrier with a different modulation scheme than the original symbols. The modulation scheme for the quasi-pilot symbols has a lower amplitude and/or phase ambiguity than the modulation scheme for the original data symbol.

24 Claims, 15 Drawing Sheets

OTHER PUBLICATIONS

J. Zhu, et al. "Channel estimation with power-controlled pilot symbols and decision-directed reference symbols," Vehicular Technology Conference, 2003, VTC 2003-Fall. 2003 IEEE 58th, vol. 2, Oct. 6-9, pp. 1268-1272.

M. Necker et al. "Totally Blind Channel Estimation for OFDM on Fast Varying Mobile Radio Channels," IEEE Transactions on Wireless Communications, vol. 3, No. 5, Sep. 2004, pp. 1514-1525.

English translation of Japanese Office Action dated Mar. 1, 2011.

* cited by examiner

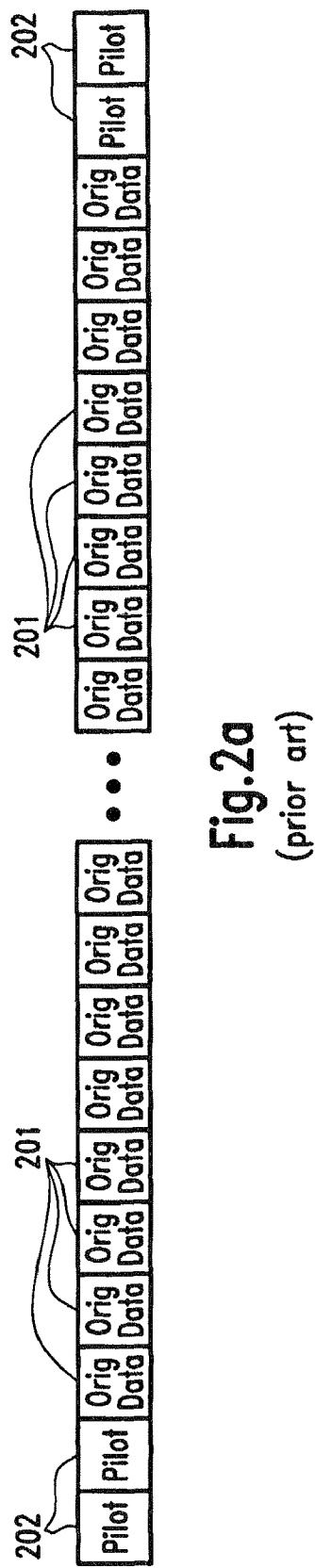
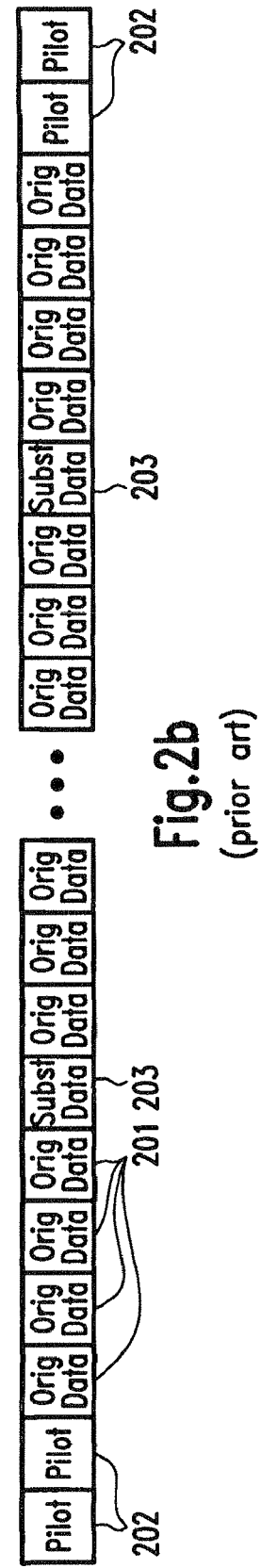
Fig.2a (prior art)
Fig.2b (prior art)

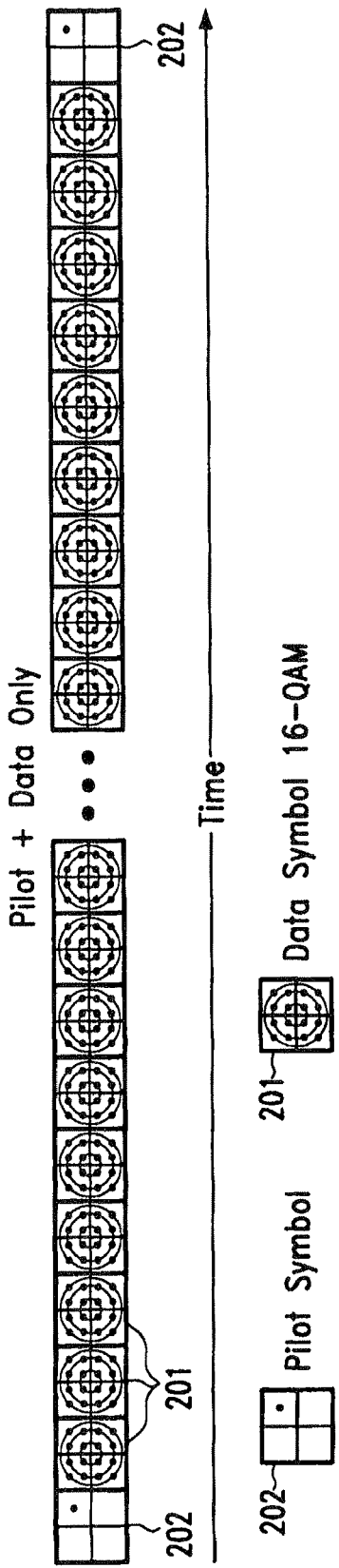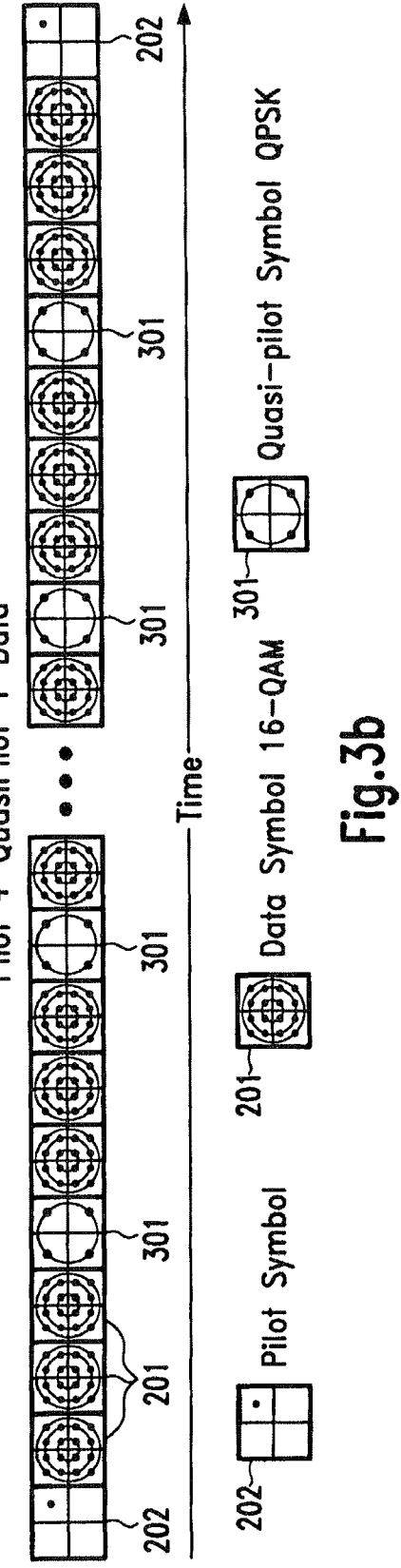

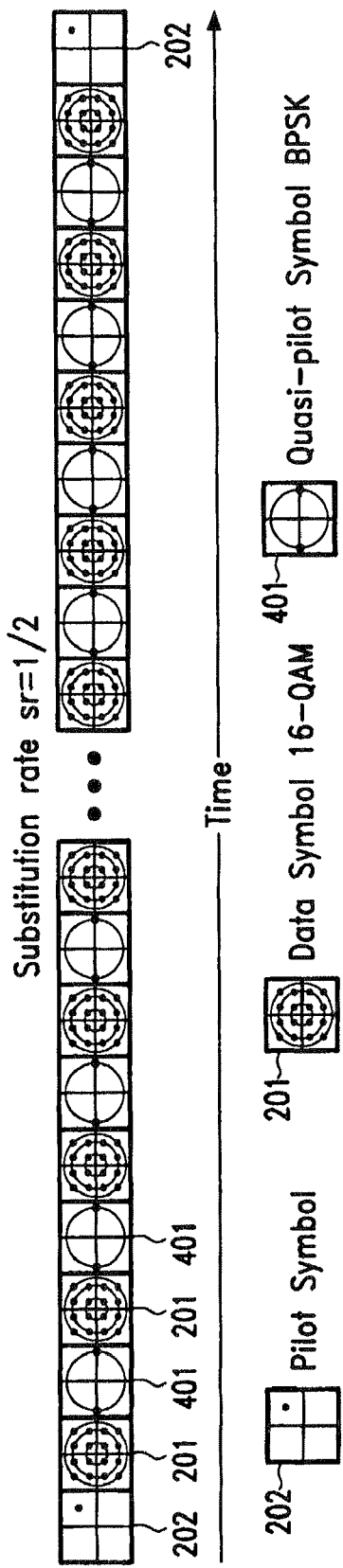
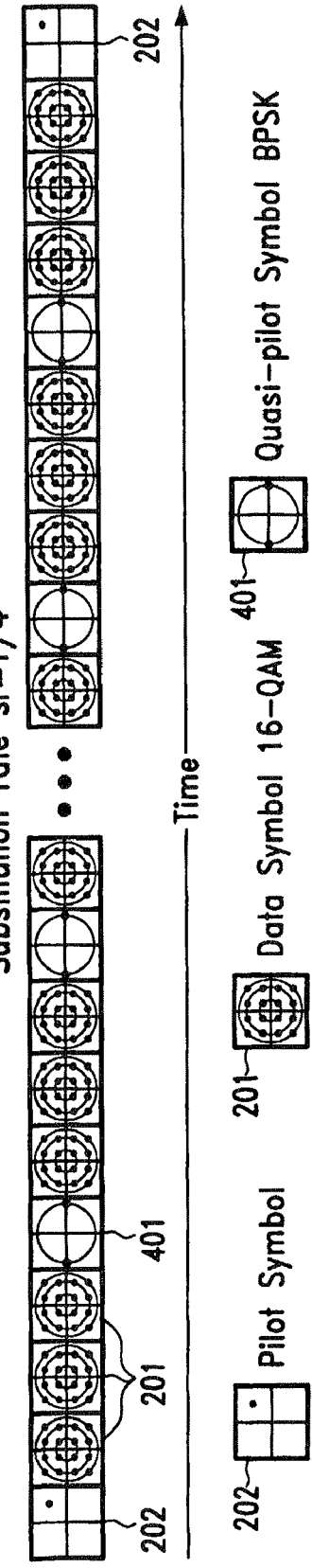

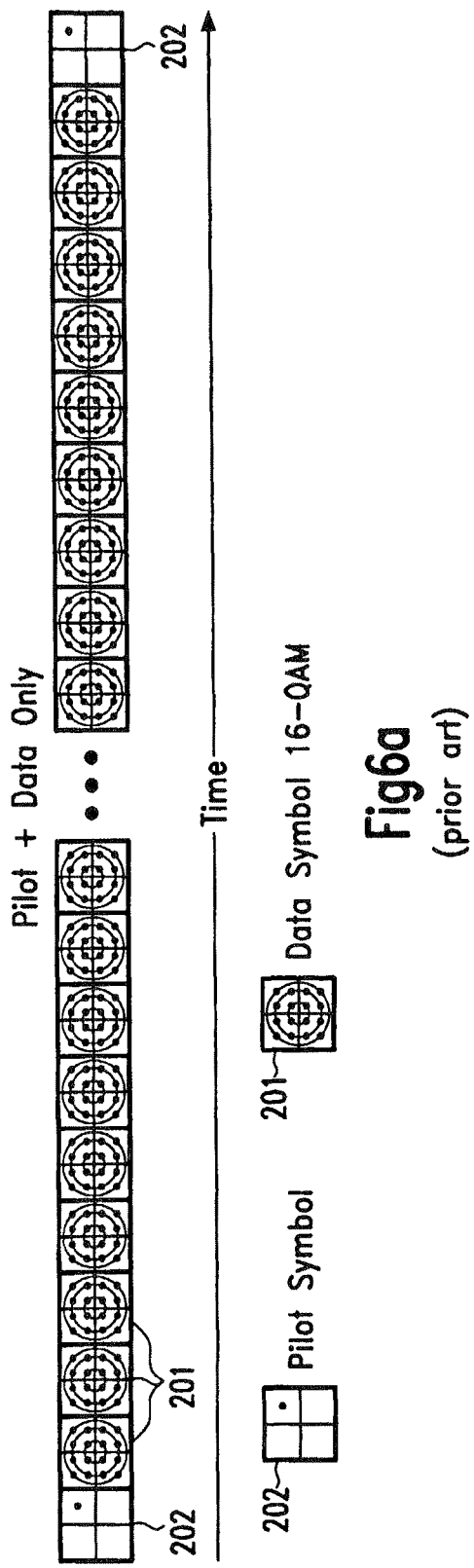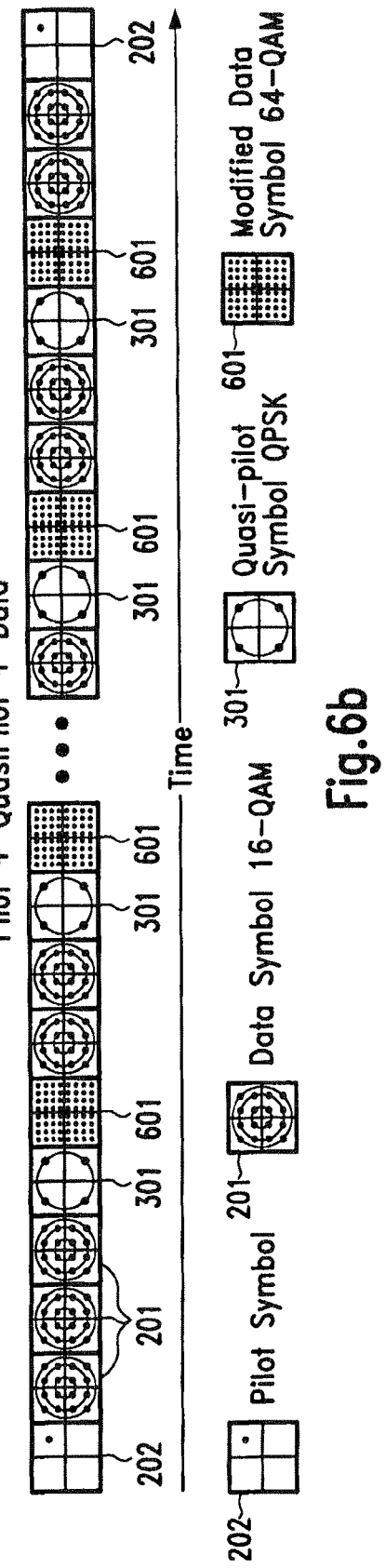

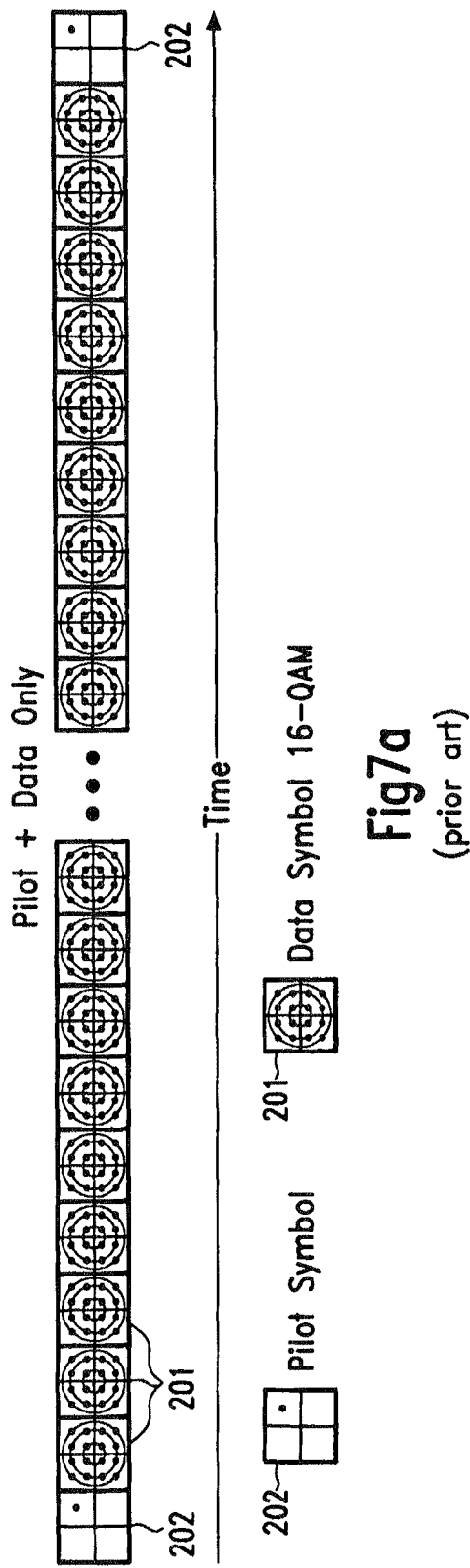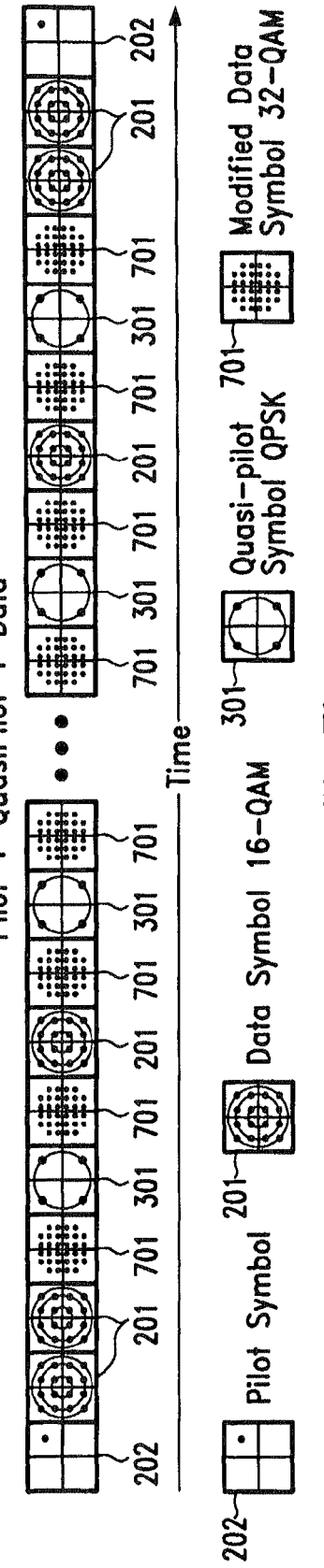

QUASI-PILOT SYMBOL SUBSTITUTION

BACKGROUND OF THE INVENTION

1. Field of the Invention

The invention relates to communication of data between a transmitter and a receiver. It is particularly applicable to communication systems where digital data is transmitted over a time-variant or frequency-variant channel, such as in mobile communication systems or satellite communication.

2. Description of the Related Art

As real transmission channels distort the modulated signal by phase shift and attenuation, and as they add noise to the signal, errors occur in the received data after demodulation. The probability for errors usually rises with rising data rate, that is with rising number of modulation states and falling symbol duration. To cope with such errors, redundancy can be added to the data, which allows to recognise and to correct erroneous data. A more economic approach is the assessment of channel properties and the adaptation of coding and/or modulation schemes to the channel properties.

"Adaptive Bit Loading" algorithms assign a modulation scheme to a resource by evaluating the channel state information to determine which modulation scheme is most efficient in terms of spectral efficiency of the transmission. For example a channel that is in a deep fade state is very vulnerable against noise errors, so a very robust modulation scheme is assigned that carries only very few data bits (for example BPSK or QPSK); on the other hand a channel that is amplifying the signal is very robust against noise errors, so a spectrally efficient modulation scheme may be assigned that carries many data bits (for example 16-QAM or 64-QAM). This is related to the technique "Adaptive Modulation and Coding" described below.

"Decision-Feedback Demodulation" is an iterative process where a first rough channel estimate (or none at all) is used to demodulate the data symbols. After demodulation, and preferably after decoding, the obtained information is fed back to the channel estimator for an improved estimation resulting from the data symbols. It should be apparent that this process causes not only delay and requires a lot of computations in each iteration step, but it also depends greatly on the quality of the first rough channel estimate due to the feedback loop.

Such procedure is known for example from Lutz H.-J. Lampe and Robert Schober, "Iterative Decision-Feedback Differential Demodulation of Bit-Interleaved Coded MDPSK for Flat Rayleigh Fading Channels", IEEE Transactions on Communications. Vol. 49, No. 7, pp. 1176-1184, July 2001.

"Adaptive Modulation and Coding" (AMC) changes the coding and modulation scheme that is employed to convey data from transmitter to receiver. The adaptation is preferably based upon one or more of the criteria channel state, required bit error rate and required data transmission rate. In communication systems the transmission is usually based upon block or frame transmission, where for example the channel state is a value which is obtained for each such frame. Consequently the adaptation rate is limited by the granularity and rate of such channel state information. Obviously the adaptation rate cannot exceed the channel state information rate, which is usually available once per frame.

A major difference between wired communication systems and wireless communication systems is the behaviour of the physical channel over which information is transmitted. The wireless or mobile channel is by its very nature variant over time and/or frequency. For a good performance in most modern mobile communication systems a demodulation of data symbols in a receiver requires an accurate estimation of the channel (also known as channel state information), usually measured by a channel coefficient, which includes knowledge about the power, the phase, or both properties of the channel. To facilitate this, usually some sort of pilot symbols are inserted into the data symbol stream which have a predetermined unambiguous amplitude and/or phase value, which can be used to determine the channel coefficient.

Usually the data symbols themselves cannot be accurately used for channel estimation, since the amplitude and/or phase are not known a priori to demodulation. This behaviour can be seen from FIG. 1 and is further detailed in Table 1 to show the number of ambiguities involved in different digital modulation schemes.

TABLE 1

Properties of selected digital modulation methods

| Modulation Scheme | Bits per Symbol | Amplitude Ambiguity | Phase Ambiguity |
|---|---|---|---|
| BPSK | 1 | None/1 Level | 2 Levels |
| QPSK | 2 | None/1 Level | 4 Levels |
| 8-PSK | 3 | None/1 Level | 8 Levels |
| 2-ASK/4-PSK | 3 | 2 Levels | 4 Levels |
| 4-ASK/2-PSK | 3 | 4 Levels | 2 Levels |
| 8-ASK | 3 | 8 Levels | None/1 Level |
| 16-PSK | 4 | None/1 Level | 16 Levels |
| 16-QAM | 4 | 3 Levels | 12 Levels |
| 4-ASK/4-PSK | 4 | 4 Levels | 4 Levels |
| 64-QAM | 6 | 9 Levels | 52 Levels |

From Table 1 it follows also easily that the performance of an iterative decision-feedback demodulation scheme will further depend greatly on the number of ambiguities involved in the modulation scheme. A wrong assumption about the sent symbol leads to a wrong result of the channel estimation. Especially in modulation schemes with a high number of modulation states there is a high probability of erroneous symbols due to inevitable noise. A wrong channel estimation, in turn, leads to wrong channel correction and consequently more errors in received symbols. Therefore there is a need in the related art for improved reliability of the channel estimation.

Generally a data modulation scheme can be used well for amplitude estimation if it shows no or very few ambiguities in its amplitude levels. From Table 1 it follows that the most interesting modulation schemes are BPSK, QPSK, 8-PSK, 16-PSK, or in fact any other pure PSK scheme, since all of these use a fixed amplitude for their transmission. A scheme like 2-ASK/4-PSK might still be applicable, as an estimator "only" has to make a kind of "blind" decision between two possibilities.

On the other hand a data modulation scheme can be used well for phase estimation if it shows no or very few ambiguities in its phase levels. From Table 1 it follows that the most interesting modulation schemes are pure ASK schemes such as the mentioned 8-ASK, since all of these use the same phase angle for their transmission. Schemes like BPSK or 4-ASK/2-PSK may be applicable, as the number of two phase levels may still be reasonably low for an estimator to extract information about the channel phase angle.

Using high order modulation constellation for the transmission of data symbols, a large number of amplitude/phase ambiguities are involved. Consequently a receiver cannot easily use these data symbols to improve its channel estimation accuracy, or it requires a huge mathematical and processing capacity in order to do so. The target of the present invention is a concept for transmission of data symbols for which it is easier for the receiver to extract information about the channel.

US 2004/0128605 A1 improves the channel estimation capability of an OFDM system in a high velocity environment by replacing selected data symbols with pilot symbols. This method uses pre-determined pilot symbols which cannot carry information and therefore reduce the efficiency of the data transmission.

EP1083719 A2 claims the adaptation of the proportion of reference (i.e. pilot) symbols into a data stream in such a fashion that the overall transmission operates at improved efficiency, for example depending on the packet size. This document focuses on the distribution or the interval of such reference symbol addition. Moreover a method is needed which allows more economic use of transmission capacity.

WO 9909720 A1 introduces a rotationally invariant modulation encoder, inserting pilot bits into a data stream, involving coding of two different data streams. The receiver demodulates and decodes the data streams in an iterative fashion to use that pilot bit information for improved channel estimation. There is a need for a more simple method which does not require to add pilot bits into the user data stream nor does require a bit evaluation at the receiver.

Jie Zhu; Wookwon Lee: "Channel estimation with power-controlled pilot symbols and decision-directed reference symbols", Vehicular Technology Conference, 2003. VTC 2003-Fall. 2003 IEEE 58th, Volume: 2, 6-9 Oct. 2003 Pages: 1268-1272 Vol. 2, introduces a least-squares scheme for decision-directed virtual pilot channel estimation. Virtual pilots are defined as data symbols which are in close proximity to their estimated transmitted value. The whole procedure is a multi-step approach, where in the first step only pilot symbols are used for a first CSI estimate. From this, data symbols are tentatively demodulated and re-modulated onto symbols. If the difference between a received and re-modulated symbol is below a threshold, that symbol is defined as a virtual pilot symbol. These virtual pilot symbols are subsequently used for an updated CSI estimation. This prior art is a receiver-specific algorithm. A method is needed which allows a receiver to extract information without the need for demodulation and re-modulation.

Marc C. Necker; Gordon L. Stüber: "Totally Blind Channel Estimation for OFDM on Fast Varying Mobile Radio Channels", IEEE TRANSACTIONS ON WIRELESS COMMUNICATIONS, Vol. 3, No. 5, September 2004, proposes a blind estimation technique which does not require pilot symbols. To resolve phase ambiguities of the estimation, a scheme is introduced which puts e.g. QPSK on one sub-carrier and 3-PSK or 5-PSK on an adjacent sub-carrier. The combination facilitates an unambiguous estimation of the phase. However a method is needed which allows to use known simple modulation schemes.

SUMMARY OF THE INVENTION

It is an object of the present invention to provide a method and an apparatus which allow reliable channel estimation while at the same time providing improved usage of transmission capacity.

In a data frame in which high order modulation symbols are used for data transmission, some selected symbols are substituted by modulation symbols that still carry data, but show a reduced number of amplitude and/or phase ambiguities compared to the original modulation symbol constellation. Due to its usage in the receiver for improved channel estimation this substitution symbol will be called herein below "Quasi-Pilot" symbol.

In one aspect of the present invention, a method for transmitting signals in a digital communication system comprises the steps of determining a first modulation scheme; determining at least one position for the transmission of quasi-pilot symbols in a data transmission stream; determining at least one further modulation scheme, having a smaller number of amplitude or phase ambiguities than the first modulation scheme, for modulation of data in the quasi-pilot symbols; transmitting data in the digital communication system according to the further modulation schemes at the determined positions for the quasi-pilot symbols; and transmitting data in the digital communication system according to the first modulation scheme at other symbol positions within the data transmission stream.

In another aspect of the present invention, a data transmitter for a digital communication system comprises means for determining a first modulation scheme; means for determining at least one position for the transmission of quasi-pilot symbols in a data transmission stream; means for determining at least one further modulation scheme, having a smaller number of amplitude or phase ambiguities than the first modulation scheme, for modulation of data in the quasi-pilot symbols; and a modulator, configured to modulate data according to the further modulation schemes at the determined positions for the quasi-pilot symbols, and to modulate data according to the first modulation scheme at other symbol positions within the data transmission stream.

BRIEF DESCRIPTION OF THE DRAWINGS

The accompanying drawings are incorporated into and form a part of the specification for the purpose of explaining the principles of the invention. The drawings are not to be understood as limiting the invention to only the illustrated and described examples of how the invention can be made and used. Further features and advantages will become apparent from the following and more particular description of the invention, as illustrated in the accompanying drawings, wherein

FIGS. 2 and 3 show each a comparison between exemplary structures for a prior art system employing only pilot and data symbols and of a system using quasi-pilot symbols according to the present invention;

FIG. 4 depicts an exemplary frame structure of substitution rates ½ and ¼ using BPSK quasi-pilot symbols;

FIG. 6 depicts a frame structure in which bits that cannot be transmitted on a quasi-pilot symbol are combined with bits of the following data symbol;

FIG. 7 depicts a frame structure in which bits that cannot be transmitted on a quasi-pilot symbol are combined with bits of the two adjacent data symbols;

DETAILED DESCRIPTION OF THE INVENTION

Figure 1:
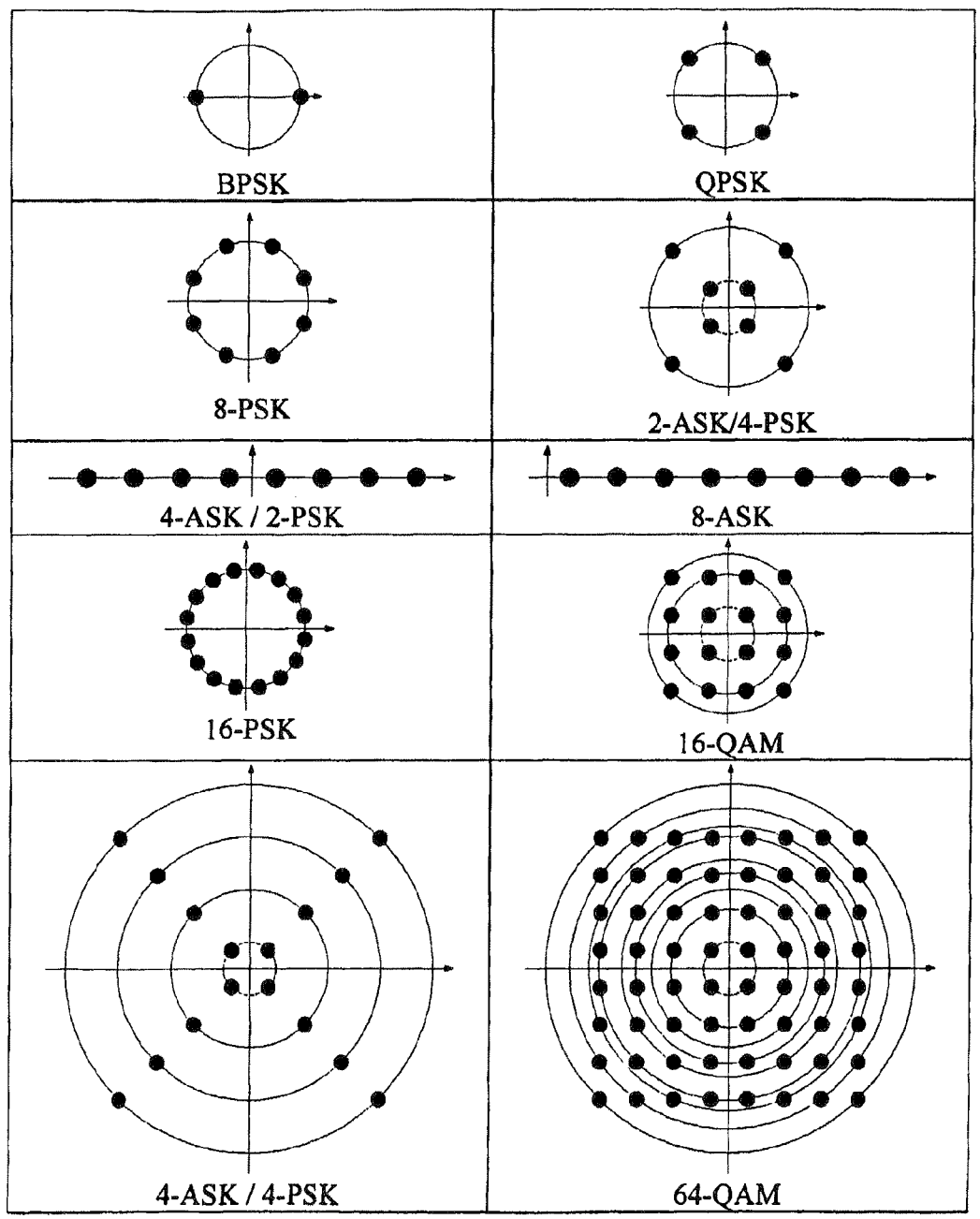
FIG. 1 is a listing of some well-known digital modulation schemes used for transmission of binary digits on a complex symbol.

The exemplary embodiments of the present invention will be described with reference to the figure drawings wherein like elements and structures are indicated by like reference numbers.

In the following the method according to the present invention is explained in terms of transmission of data in the time domain, that is positions of data symbols are positions in time, spacing is described as being distance in time and so on. However, the method can accordingly also be applied in the frequency domain with positions being carrier frequencies, spacing meaning frequency differences and so on. Likewise an extension into further data transmission domains or combinations of domains is easily possible, for example both in time and frequency as in an OFDM system.

For simplicity, a data modulation scheme that exhibits a number of ambiguity levels that prohibit the efficient use of this symbol for channel estimation will be called herein below an HAM scheme (HAM=High Ambiguity Modulation). It should be obvious that depending on the particular modulation scheme it may be unsuitable for amplitude estimation, phase estimation, or both. Therefore these will be referred to as AHAM (Amplitude High Ambiguity Modulation), PHAM (Phase High Ambiguity Modulation), and CHAM (Combined High Ambiguity Modulation) respectively. Examples are 16-ASK for AHAM, 16-PSK for PHAM, 16-QAM for CHAM.

Conversely, a data modulation scheme that exhibits a number of ambiguity levels that facilitates the efficient use of this symbol for channel estimation will be called an LAM scheme (LAM=Low Ambiguity Modulation). It should be obvious that depending on the particular modulation scheme it may be suitable for amplitude estimation, phase estimation, or both. Therefore we will refer to these as ALAM (Amplitude Low Ambiguity Modulation), PLAM (Phase Low Ambiguity Modulation), and CLAM (Combined Low Ambiguity Modulation) respectively. Examples are 16-PSK for ALAM, 16-ASK for PLAM, 2-ASK/2-PSK for CLAM.

Transmission using data symbols with a high number of ambiguities has beneficial properties:
1 A high number of bits can be conveyed on one HAM symbol.
2 Gaussian noise resilience of HAM symbols can be higher than for LAM symbols assuming an equal number of bits conveyed on a symbol.

Assuming that a HAM scheme is chosen to transmit a high data rate (for example by AMC), according to the present invention a number of HAM original symbols are substituted with LAM substitution symbols to increase the channel estimation capability at the receiver side. This LAM substitution symbol will be also called quasi-pilot symbol, as it may be used for a similar purpose as a pilot symbol as outlined previously.

The difference to prior art AMC is that AMC can assign a single modulation scheme as outlined in the prior art section for one (or more) frames, such that all symbols in that frame employ said assigned modulation scheme. The present invention proposes to substitute symbols within this frame, such that the modulation scheme is varying within a frame. Clearly this is a feature that cannot be achieved by AMC by its very definition.

The difference to prior art pilot transmission is that a pilot symbol according to prior art is defined as an a-priori known symbol both to the transmitter and the receiver. Therefore it cannot convey data. Clearly the quasi-pilot symbol conveys data.

FIGS. 2a and 3a show examples of a conventional frame structure using pilot symbols 202. In FIG. 2a, the frame starts and ends with 2 pilot symbols 202 each, which allow channel estimation for this frame. Inbetween, data symbols 201 are transmitted using a high-order modulation scheme like 16 QAM or 64 QAM with a high degree of ambiguity. The demodulator in the receiver stores an entire frame and performs channel estimation based on amplitude and phase of the received pilot symbols which have been sent with predefined amplitude and phase. The data symbols 201 can then be demodulated with improved accuracy using the channel estimation for equalisation of the received modulated signal. The demodulation results can be used for decision feedback for following frames. Furthermore results of channel estimation and demodulation can be fed back to the transmitter for the purpose of AMC.

FIG. 2b shows an example using the present invention for improved accuracy of channel estimation. As in FIG. 2a, each frame starts and ends with two pilot symbols 202. In the example of FIG. 2b, each fifth data symbol is substituted by a quasi-pilot symbol 203 carrying data but having a modulation scheme with reduced ambiguity compared to the modulation scheme employed for the other data symbols 201. In the example of FIG. 3b, original data symbols are modulated with 16 QAM, whereas quasi-pilot symbols are modulated with QPSK. Starting from the channel estimation obtained from the pilot symbols, variations of the channel properties within the duration of the frame can be estimated using the quasi-pilot signals. The reduced ambiguity reduces the danger of misdetections of received symbols and consequently also the danger of faulty channel estimation. As the channel variations between two quasi-pilot symbols are smaller than between pilot symbols, channel estimation may be continuously refined from the demodulation of the quasi-pilot symbols with reasonable stability against misdetections.

Figure 5A:
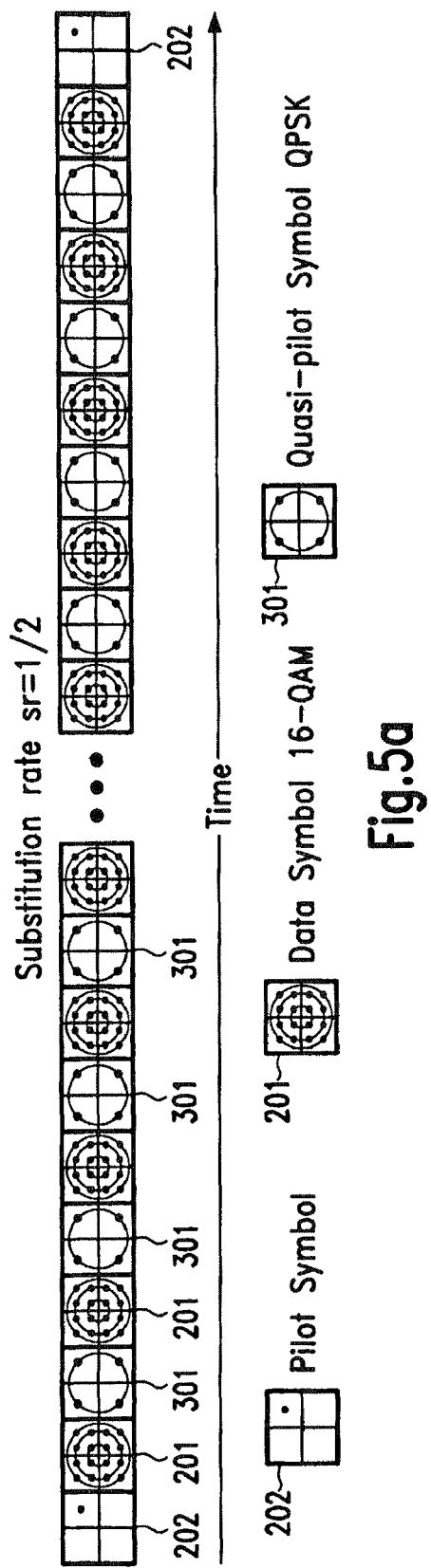
FIG. 5 illustrates an exemplary frame structure of substitution rates ½ and ¼ using QPSK quasi-pilot symbols.
Figure 5B:
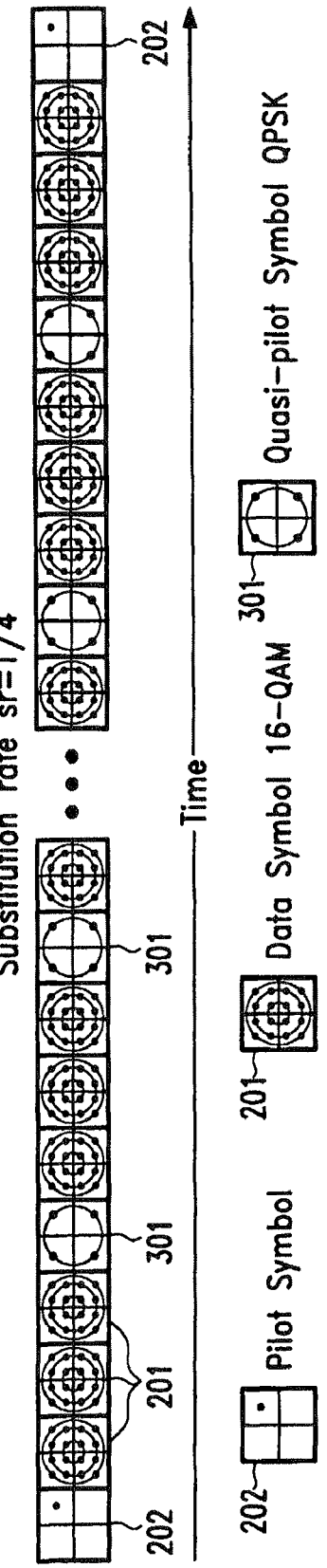

FIGS. 4 and 5 show two more examples of the usage of quasi-pilot symbols, with BPSK modulation in FIG. 4 and QPSK modulation in FIG. 5. In FIG. 4a every second data symbol is substituted for a quasi-pilot symbol 401, whereas in FIG. 4b only every fourth data symbol is substituted. This ratio will be called herein below "substitution rate". Therefore the frames of FIGS. 4a and 5a show a substitution rate of ½, whereas the frames of FIGS. 4b and 5b have a substitution rate of ¼.

The quasi-pilot substitution of data symbols may encompass the following options:
Equal Size Substitution
Assuming that an original data symbol carries n bits, the quasi-pilot substitution symbol should carry m=n bits as well. This may deteriorate the transmission quality of the n bits in the quasi-pilot substitution symbol compared to the original data symbol, but it simplifies the architecture of transmitter and receiver.
Example:
  Original data symbol: 16-QAM (n=4)
  This involves 3 amplitude levels and 12 phase levels
  Quasi-pilot substitution symbol: 16-PSK, 2-ASK/8-PSK, 4-ASK/4-PSK, 8-ASK/2-PSK, 16-ASK each can carry m=4 bits Each of these reduces the number of amplitude levels, phase levels, or both.

Reduced Size Substitution

Assuming that an original data symbol carries n bits, the quasi-pilot substitution symbol should carry m<n bits. This may be achieved by puncturing the n−m bits that cannot be transmitted, before modulation, or by modifying e.g. the code rate of a FEC code in case that such a code is employed in a system. The advantage of this option is the reduced loss of transmission quality compared to the original data symbol for the transmitted m bits in the quasi-pilot substitution symbol. In fact for certain modulation schemes the transmission quality of the m bits may be improved.

Example:
Original data symbol: 16-QAM (n=4)
This involves 3 amplitude levels and 12 phase levels
Quasi-pilot substitution symbol: BPSK, 2-ASK (m=1); QPSK, 2-ASK/2-PSK, 4-ASK (m=2); 8-PSK, 2-ASK/4-PSK, 4-ASK/2-PSK, 8-ASK (m=3).

As in the example of FIG. 3b the quasi-pilot QPSK symbol 301 can transmit m=2 bits instead of the n=4 bits of a 16-QAM symbol 201, the data stream has to be adapted accordingly. This can be achieved by puncturing n−m=2 bits per quasi-pilot symbol, either lowering the data rate or reducing the amount of redundancy in a coded system.

Alternatively the n−m=2 bits are combined with the n=4 bits of a data symbol such that a modified data symbol now conveys 2*n−m=6 bits e.g. on a 64-QAM symbol; or the each of the n−m=2 bits are combined with the n=4 bits of data symbols, such that a modified data symbol conveys n+1=5 bits, requiring 2 such modified data symbols so that the total number of bits is kept constant.

This is illustrated in FIGS. 6 and 7. FIG. 6a shows a conventional data frame with data symbols 201, here 16-QAM modulated, and pilot symbols 202 at each end. In FIG. 6b four of the data symbols are replaced by quasi-pilot symbols 301 employing QPSK modulation. Each data symbol can transmit n=4 bits, each quasi-pilot symbol m=2 bits. n−m=2 data bits of the data symbols replaced by the quasi-pilot symbols are combined with 4 bits of the succeeding data symbols into modified data symbols 601 and transmitted using 64-QAM which can transmit 6 bits per symbol. In FIG. 7b the n−m=2 bits which cannot be transmitted on the quasi-pilot symbol are transmitted in two modified data symbols 701 per quasi-pilot symbol, such that each modified data symbol has to transmit 5 bits instead of 4 bits. Therefore 32-QAM modulation is sufficient for the modified data symbols in this case. Accordingly, the n−m bits can also be distributed over more than two modified data symbols.

It should further be noted that the positions of the modified data symbols do not have to be adjacent to the quasi-pilot symbols from which they carry data, although this position might bear the advantage of easy implementation.

Figure 8:
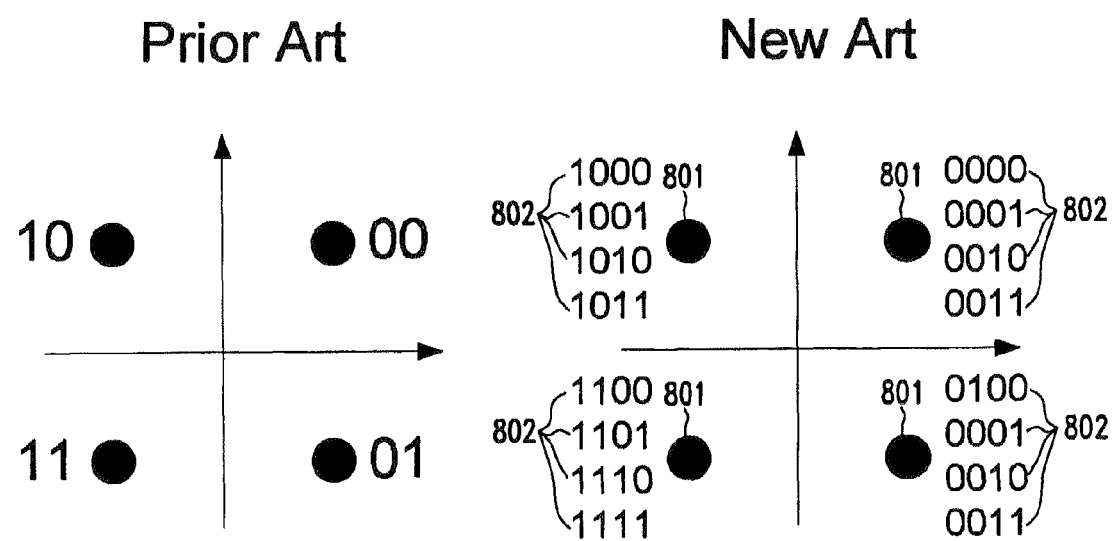
FIG. 8 illustrates an example of ambiguous mapping.

In yet another embodiment, the mapping rules may be modified such that the mapping of n bits onto a quasi-pilot symbol is not unambiguously reversible, such that e.g. four different words of n bits are mapped onto the same quasi-pilot symbol value. This is illustrated in FIG. 8. To each of the four modulation states 801 four four-bit data words 802 are mapped, such that one 16-QAM symbol can be transmitted with one QPSK quasi-pilot symbol. Unlike in FIGS. 6 and 7, and similar to the puncturing approach, the information of two of the four bits is lost with this method due to the mapping of four words onto the same modulation state.

Increased Size Substitution

Assuming that an original data symbol carries n bits, the quasi-pilot substitution symbol should carry m>n bits. This may be achieved by repeating m−n bits of the n bits before modulation, or by modifying e.g. the code rate of a FEC code in case that such a code is employed in a system. While this option can transmit a higher amount of bits, it will generally result in a dramatic loss of transmission quality compared to the original data symbol for each bit in the quasi-pilot substitution symbol.

Example:
Original data symbol: 2-ASK/4-PSK (n=3)
This involves 2 amplitude levels and 4 phase levels
Quasi-pilot substitution symbol: 16-PSK, 16-ASK (m=4).

Substitution for Improved Amplitude Estimation

In order to improve the amplitude estimation of the channel, a preferred solution is to substitute with a symbol that shows no amplitude ambiguities. Consulting Table 1 we find that any PSK scheme may be suitable for this (BPSK, QPSK, m-PSK), as all signal points are transmitted using the same power, usually normalized to a value of 1.

Substitution for Improved Phase Estimation

In order to improve the phase estimation of the channel, a preferred solution is to substitute with a symbol that shows no phase ambiguities. Consulting Table 1 we find that any ASK scheme may be suitable for this, as all signal points are transmitted using the same angle or phase, usually normalized to a value of 0 degrees against the real axis.

Substitution for Improved Amplitude and Phase Estimation

Obviously the best way to improve amplitude and phase estimation is to transmit a fully-known symbol, for example a complex value of $e^{j*p/4}$. This is in fact a pilot symbol, as no data bits in the sense of user- or service-specific data is transmitted in the symbol.

Therefore a preferred solution is to transmit a quasi-pilot symbol that minimizes the ambiguities in amplitude and phase, with the constraint that there is an ambiguity either in amplitude, or in phase, or in both. These ambiguities facilitate the transmission of data bits. For example a quasi-pilot substitute symbol of BPSK shows one amplitude level and two phase levels, carrying one data bit. Conversely a quasi-pilot substitute symbol of 2-ASK shows two amplitude levels and one phase level, carrying also one data bit. Depending on the expected nature of the channel, the reduction of amplitude levels or of phase levels may be given a priority and therefore dominate the selection of the LAM scheme for the quasi-pilot. On the other hand the requirement to transmit many data bits in the quasi-pilot substitute symbol may require the transmission of a LAM scheme with more ambiguity levels.

In another preferred solution, to improve both amplitude and phase estimation of the channel, the reduction of levels may be obtained by employing several quasi-pilot symbols with different targets. A first quasi-pilot symbol may employ an ALAM scheme that improves the amplitude estimation, while another quasi-pilot symbol may employ a PLAM scheme that improves the phase estimation.

Figure 9:
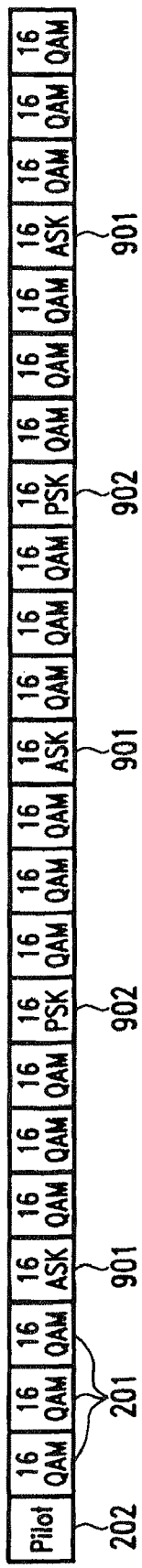
FIG. 9 shows an example of a frame structure with alternating ASK and PSK quasi-pilot symbols.

FIG. 9 shows an example of the described method, in which two different modulation schemes are employed for quasi-pilot symbols. A part 901 of the quasi-pilot symbols is modulated with ASK, another part 902 with PSK. Quasi-pilot symbols 901 and 902 are substituted alternately for original data symbols. Thus it is possible to obtain phase estimation and amplitude estimation of the channel using the two different types of quasi-pilot symbols. In the example of FIG. 9 the quasi-pilot symbols have the same number of modulation states which allows to maintain the original input data rate and redundancy at the cost of slightly increased error probability. In other implementations a lower number of modulation states might be chosen for the quasi-pilot symbols.

Placement of Quasi-Pilot Symbols Between Pilot Symbols

Generally the placement of quasi-pilot symbols onto locations between non-consecutive pilot symbols is up to the design of a communication system and the kind of channel variation that is to be expected. However some general guidelines are given here.

In FIG. 3 and FIG. 4 the placement of the quasi-pilot symbols is chosen such that the distance between quasi-pilot symbols is constant, and furthermore is also equal to the distance between a pilot symbol and its closest quasi-pilot symbol. This is related to the Nyquist sampling theorem in such a way that the interval between pilot/quasi-pilot symbols is related to the inverse of the sampling rate. According to the Nyquist theorem the sampling rate of an analogue process has to be at least twice the highest occurring rate (e.g. frequency for a time process) of that process for lossless reconstruction of the analogue process from the obtained digital samples. With the present invention the channel properties can be regarded as being sampled by the pilot and quasi-pilot symbols. Consequently it makes sense that the pilot and quasi-pilot symbols, i.e. the sampling points, are equidistant e.g. in time or frequency, depending on the communication system.

Alternatively some quasi-pilot symbols may be placed in adjacent positions to be able to obtain more samples where the channel state is not fluctuating significantly, in order to reduce the influence of noise on the estimation. To this end, the estimation based on such adjacent quasi-pilot symbols may be combined, e.g. by averaging. Of course the spacing between groups of adjacent quasi-pilot symbols may again be chosen to be equidistant.

Figure 15A:
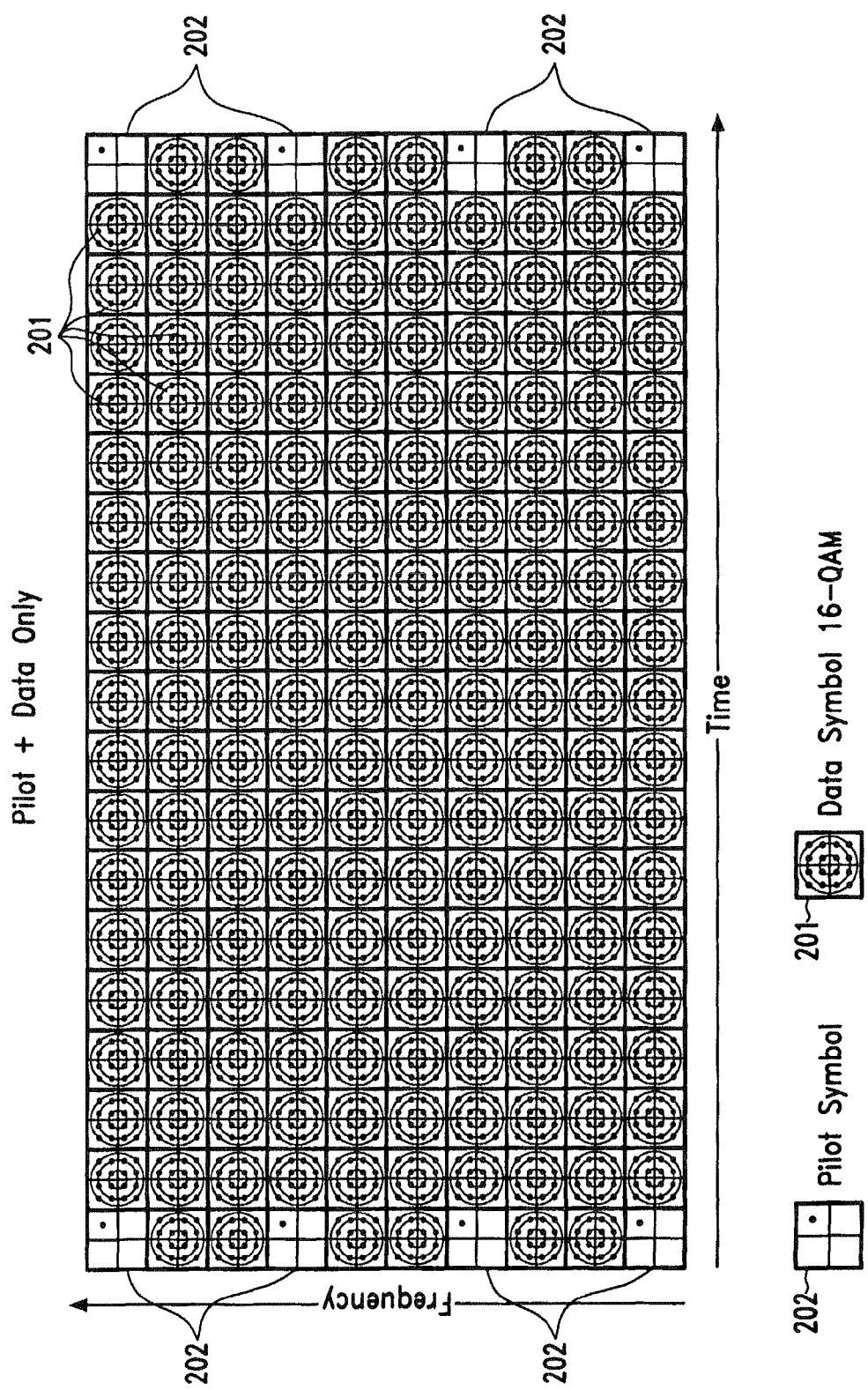
FIG. 15 shows examples of data transmission in an OFDM system.

FIG. 15 shows examples of data transmission in an OFDM system. In FIG. 15a, pilot symbols 202 are placed in some of the frequency channels at the beginning and at the end of the frame. As channel properties may vary only little over frequency, in particular with narrow band frequency channels, it is not always necessary to place pilot symbols in all frequency channels.

Figure 15B:
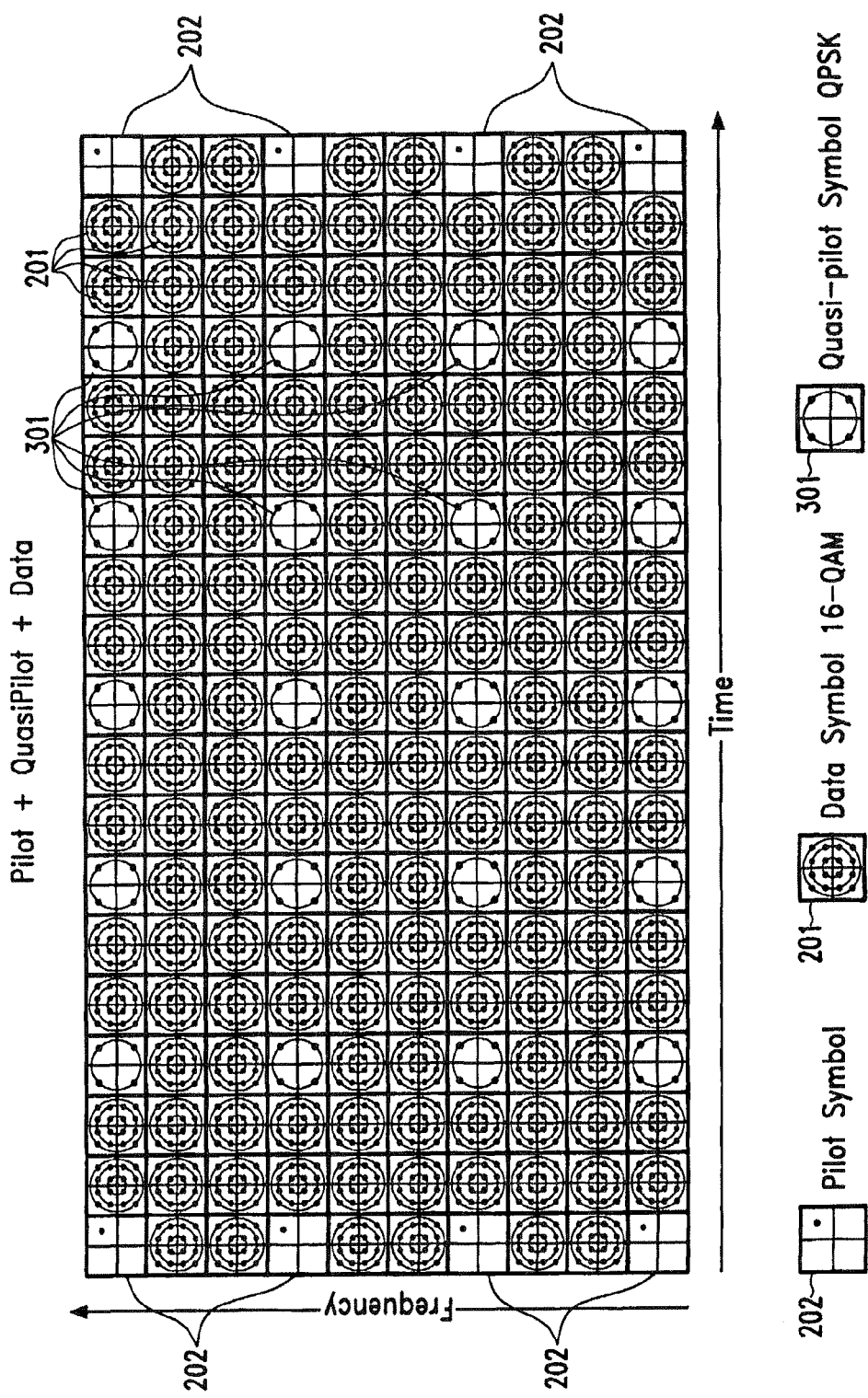
Figure 15C:
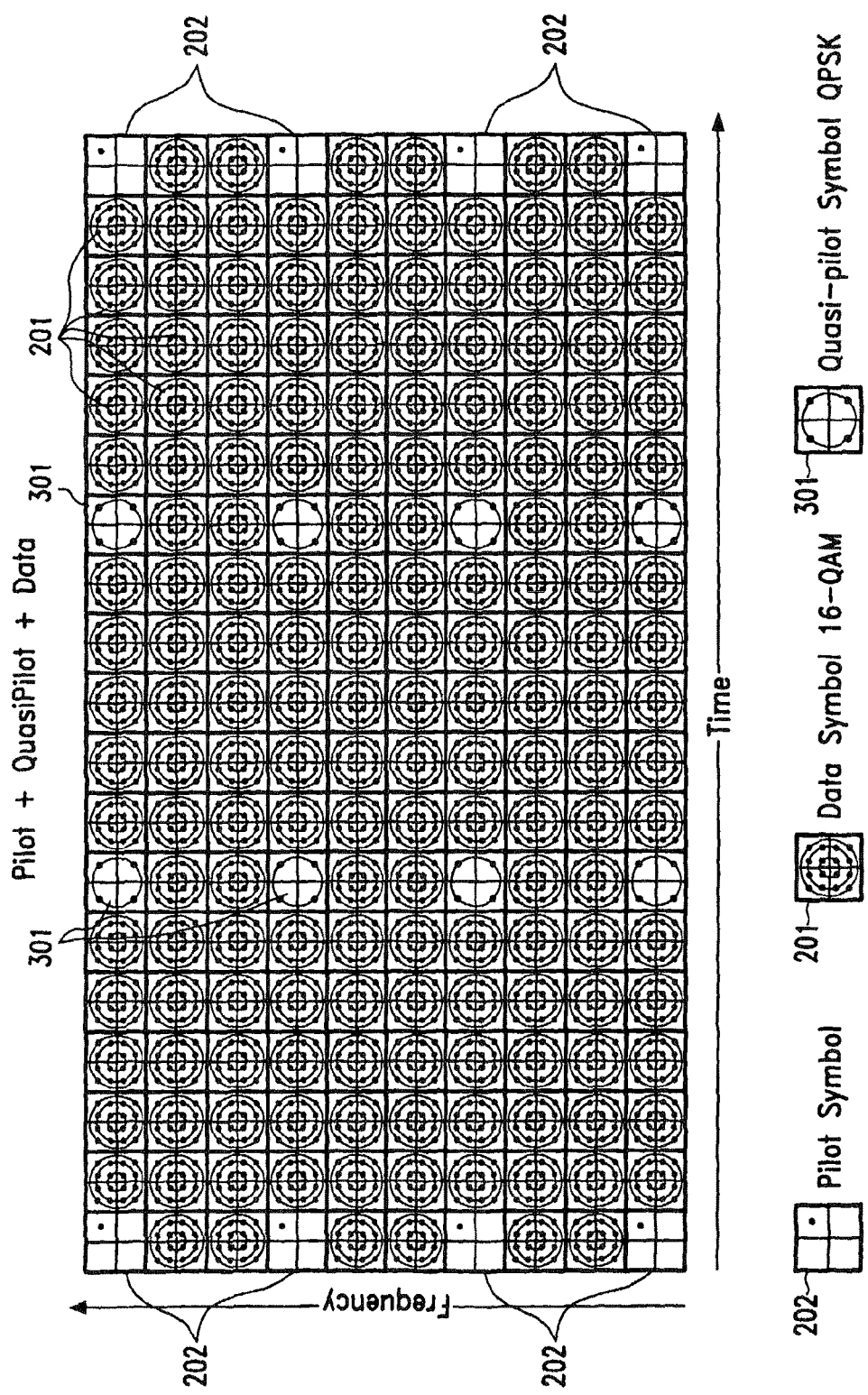

The rest of the symbol positions is used for data symbols. In FIG. 15b quasi-pilot symbols 301 are substituted for a part of the data symbols 201 at equally spaced positions between the pilot symbols 202. In this example the spacing is equidistant in time direction and frequency direction. The spacing need not be the same in terms of frequency channels as in terms of time positions. In FIG. 15c, for example, the quasi-pilot symbols are spaced by six symbol positions in the time direction and by three frequency channels in the frequency direction.

Other more irregular patterns may be desirable if it is assumed that in certain positions the channel is fluctuating more than in other positions. Those areas where the channel is assumed to be constant can have larger distances between pilot/quasi-pilot symbols, while those areas with high fluctuation may require smaller distances between pilot/quasi-pilot symbols.

The substitution rate may be dynamically adapted based on the channel estimation results. In this case the transmitter has to receive information from the receiver about the channel quality and to inform it about the actual substitution rate. In a similar manner, the modulation scheme used for the quasi-pilot symbols may depend on the channel state and on the rate of change thereof. For example, in a noisy channel a modulation scheme with higher reduction of ambiguity may be employed than in a channel with better signal-to-noise ratio.

Figure 10:
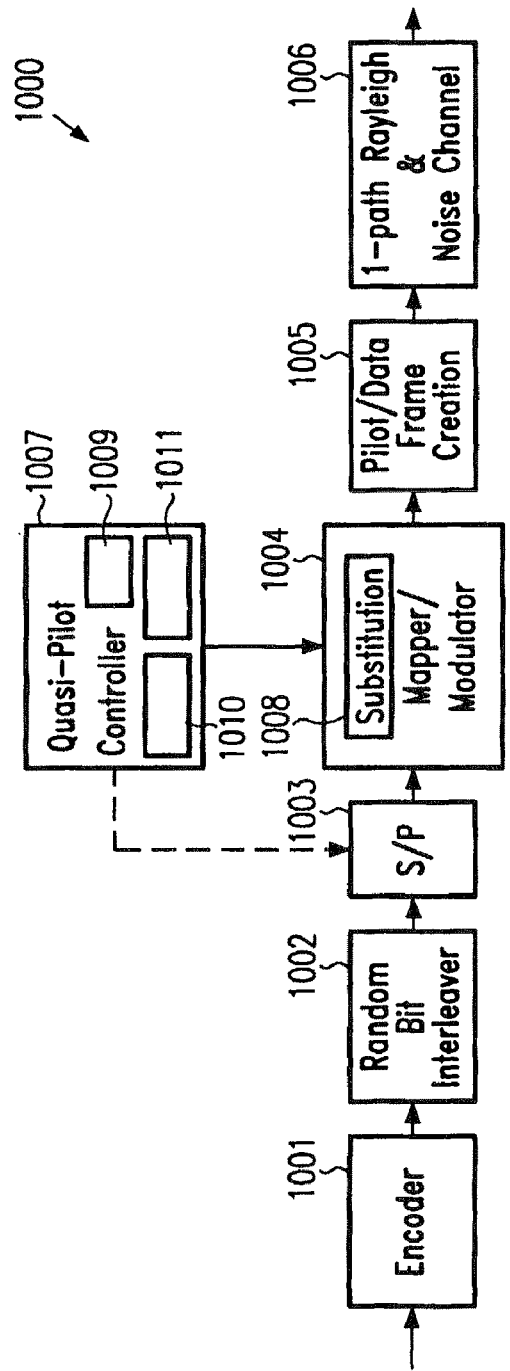
FIG. 10 depicts an exemplary transmitter structure.

FIG. 10 depicts an exemplary transmitter structure in which the method according to the present invention can be applied.

In the transmitter 1000, an information bit stream to be transmitted is encoded in encoder 1001. The encoded bit stream is interleaved in random bit interleaver 1002. In S/P unit 1003, groups of bits are combined to data words. The number of bits to be combined depends on the number of modulation states available in the first modulation state. For example, for 16-QAM Id 16=4 bit are combined into one data word, for 64-QAM Id 64=6 bit are combined into one data word. The generated words are sent to mapper/modulator 1004. Mapper/modulator 1004 maps data words to modulation states according to one of several modulation schemes. These modulation schemes comprise at least those chosen for the data symbols and the quasi-pilot symbols. These modulation schemes may be variant over time, as for example in AMC.

After the mapping, pilot data is added and frames are combined in Pilot/Data frame creation unit 1005. The resulting signal is sent to a receiving entity via channel 1006.

Quasi-pilot controller 1007 determines a first modulation scheme for transmission of data symbols with sub-unit 1009, determines positions of quasi-pilot symbols in the frame with sub-unit 1010 and at least one further modulation state for the transmission of the quasi-pilot symbols with sub-unit 1011. During data transmission it instructs substitution unit 1008 within mapper/modulator 1004 to replace the original data symbols by corresponding quasi-pilot symbols according to one of the methods and variants described above. If the modulation scheme employed for the quasi-pilot symbols has fewer modulation states than the first modulation scheme applied for the original data symbols, the mapper may map plural data word values to at least a part of the modulation states, which is effectively a puncturing of data bits. Alternatively, the combination of bits into symbols may be changed, which results in a lower input data rate. Alternatively, the bits that cannot be conveyed on a quasi-pilot symbol are combined with the bits of one or more data symbols increasing the number of modulation states for those modified data symbols.

Depending on the particular implementation, transmitter 1000 may comprise further units like IF stage, mixers, power amplifier or antenna. From a signal flow point of view, such units might also be seen comprised in channel 1006, as they all may add noise to the signal or exert phase shift or attenuation on the signal.

Units 1001 to 1005 and 1007 to 1011 may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

The basic steps of the method described above are illustrated in FIG. 11. In S1101 a first modulation scheme is determined for the normal transmission of data symbols. This may be done statically by reading respective data from a memory or dynamically depending on data received from another entity or depending on channel properties. In S1102 positions for quasi-pilot symbols in the transmitted data stream are determined. These positions might for example be defined relative to an existing frame structure or relative to a system time scale. The positions again might be determined statically or dynamically. In S1103 one or more further modulation schemes are determined for the quasi-pilot symbols. These modulation schemes have either a reduced amplitude ambiguity compared to the first modulation scheme or a reduced phase ambiguity or both. If more than one further modulation schemes are determined, they are associated with the determined positions, one modulation scheme per position. Even the further modulation schemes might be statically determined or variable over time.

During data transmission, quasi-pilot controller 1007 checks in step S1104 whether the position of the symbol to be transmitted next belongs to the positions determined in S1102. In this case one of the further modulation schemes is applied for the next data symbol transmission in S1105. Otherwise the first modulation scheme is applied for transmission of the next data symbol in S1106.

Figure 11:
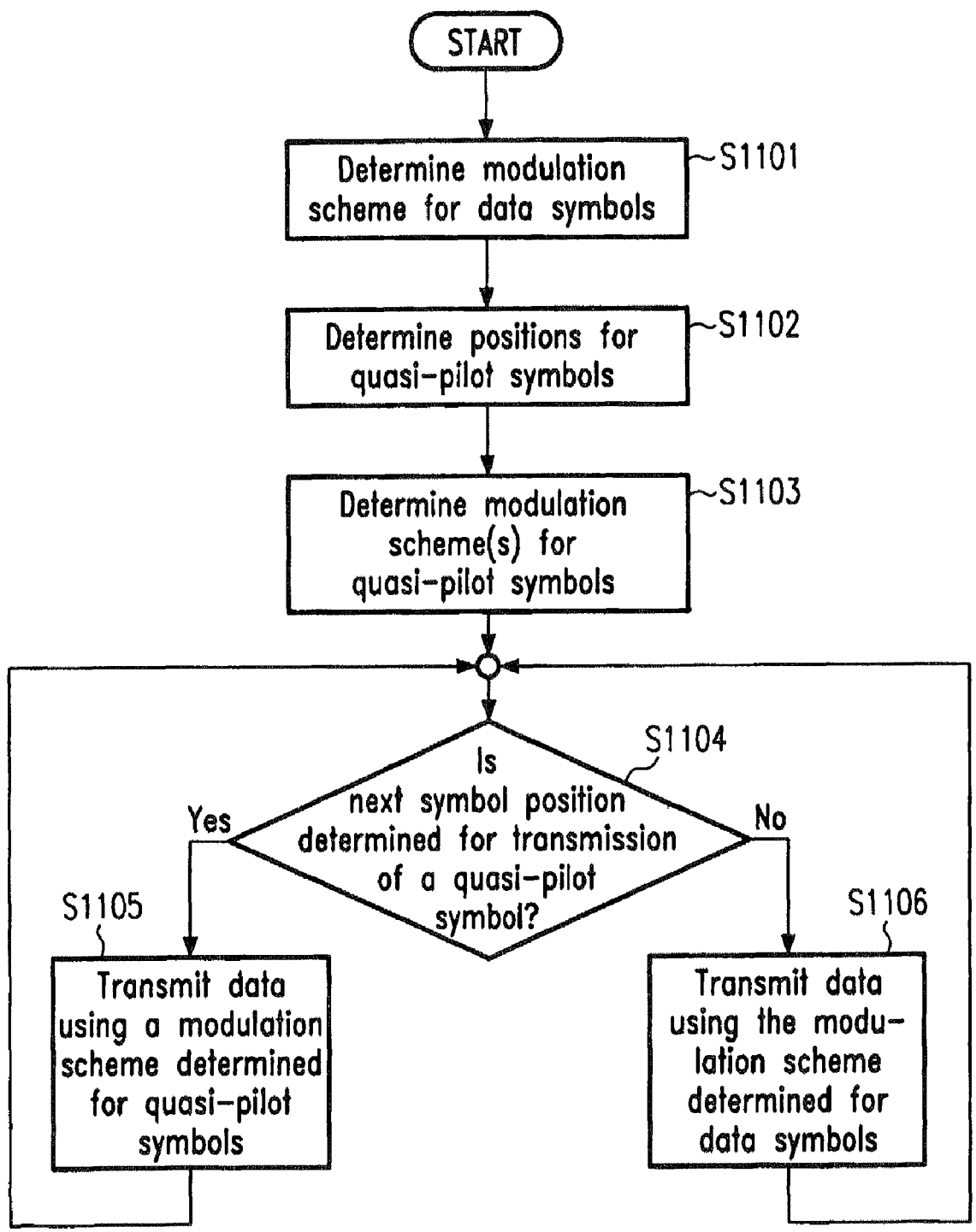
FIG. 11 illustrates the basic steps of the method described below.

It may be noted that for simplicity these steps with reference to FIG. 11 do not show all possibilities that the present invention allows in detail. However such details will be easily incorporated following the detailed description within the present disclosure of the invention.

Figure 12:
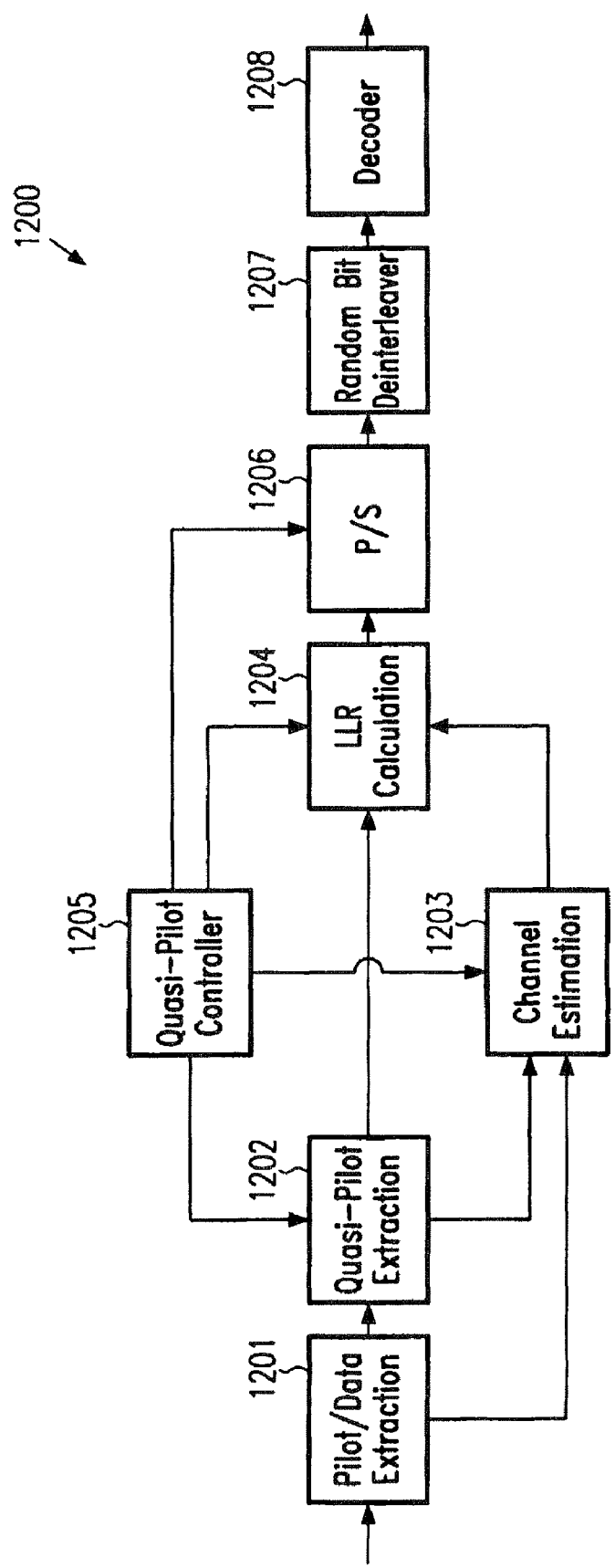
FIG. 12 shows the structure of a receiver which can receive a stream of data containing quasi-pilot symbols.

FIG. 12 shows the structure of a receiver which can receive a stream of data containing quasi-pilot symbols. Pilot/data extraction unit 1201 separates pilot symbols from data symbols according to their determined positions in the frame structure. The pilot symbols are forwarded to channel estimation unit 1203 which can derive amplitude gain and phase shift values of the transmission channel from the received amplitude and phase of the pilot symbols. Data and quasi-pilot symbols are handed on from pilot/data extraction unit 1201 to quasi-pilot extraction unit 1202. Different from unit 1201, this unit passes all received symbols to LLR calculation unit, as quasi-pilot symbols also carry data. Quasi-pilot controller 1205 controls quasi-pilot extraction unit 1202 to pass copies of quasi-pilot symbols from certain positions within the frame to channel estimation unit 1203 to support channel estimation in modulation domain intervals between pilot symbols. Further, quasi-pilot controller 1205 informs log likelihood calculation unit 1204 about the modulation scheme which is different for quasi-pilot symbols from that of plain data symbols. Accordingly parallel/serial converter 1206 is informed by quasi-pilot controller 1205 about the number of bits per symbol, which may be different for quasi-pilot symbols than for normal data symbols. Random bit deinterleaver (1207) and decoder (1208) may then work as known from prior art.

In the case of quasi-pilot symbols, channel estimation unit 1203 may have to make a decision on the transmitted quasi-pilot symbol to determine the channel properties. This is subject to detection errors, but the error rate is greatly reduced compared to normal data symbols due to the reduced phase and/or amplitude ambiguity. If quasi-pilot symbols with ASK modulation are used for the phase estimation and quasi-pilot symbols with PSK modulation are used for the gain estimation, such a decision may be omitted, as there is no remaining ambiguity for the respective channel property.

In the case of FIGS. 6 and 7 where bits, which cannot be transmitted in the quasi-pilot symbols due to their reduced number of modulation states, are transmitted with other symbols having an increased number of modulation states, quasi-pilot controller 1205 controls LLR-Calculation-unit 1204 to operate on a different data modulation scheme for these symbols, and P/S-unit 1206 to rearrange the bits between the symbols such that its output bit stream equals the bit stream which had originally entered S/P unit 1003 of the transmitter.

In the case where groups of quasi-pilot symbols are transmitted in adjacent positions within the frame, quasi-pilot controller 1205 may control channel estimation unit 1203 to average the channel estimation results obtained from adjacent quasi-pilot symbols.

It should be obvious to a person skilled in the art that the positions of quasi-pilot symbols may for example be predetermined by the communication system, may be statically negotiated during a connection setup between transmitter and receiver, or may be determined statically or dynamically by either the transmitter or the receiver and signalled to the respective other entity.

Units 1201 to 1208 may be implemented in dedicated hardware or in a digital signal processor. In this case the processor performs the tasks of the units by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

Figure 13:
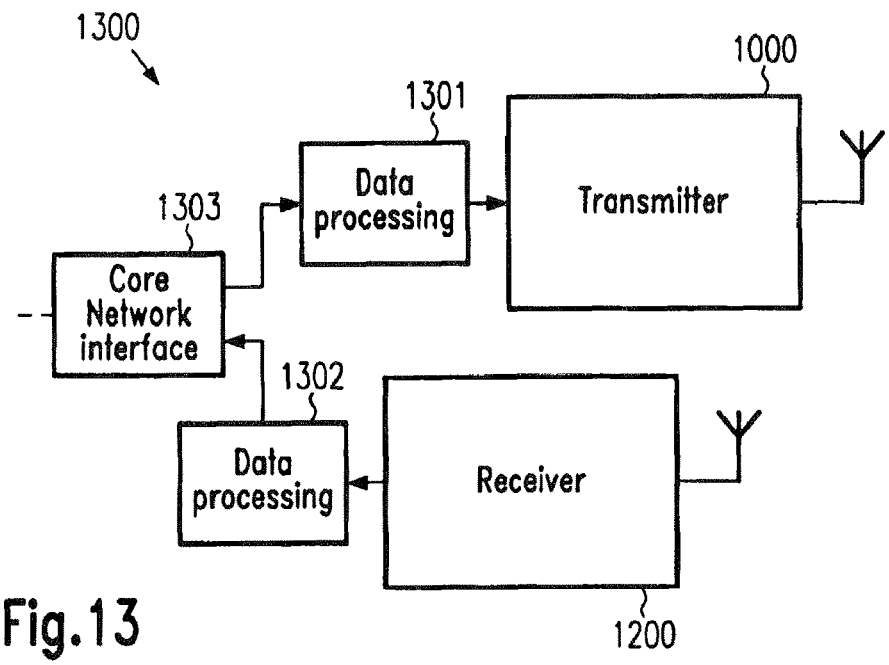
FIG. 13 illustrates an exemplary block schematic of a base station.

Transmitter 1000 and/or receiver 1200 may be part of a base station 1300 as shown in FIG. 13. Such a base station may further comprise data processing units 1301 and 1302 and a core network interface 1303.

Figure 14:
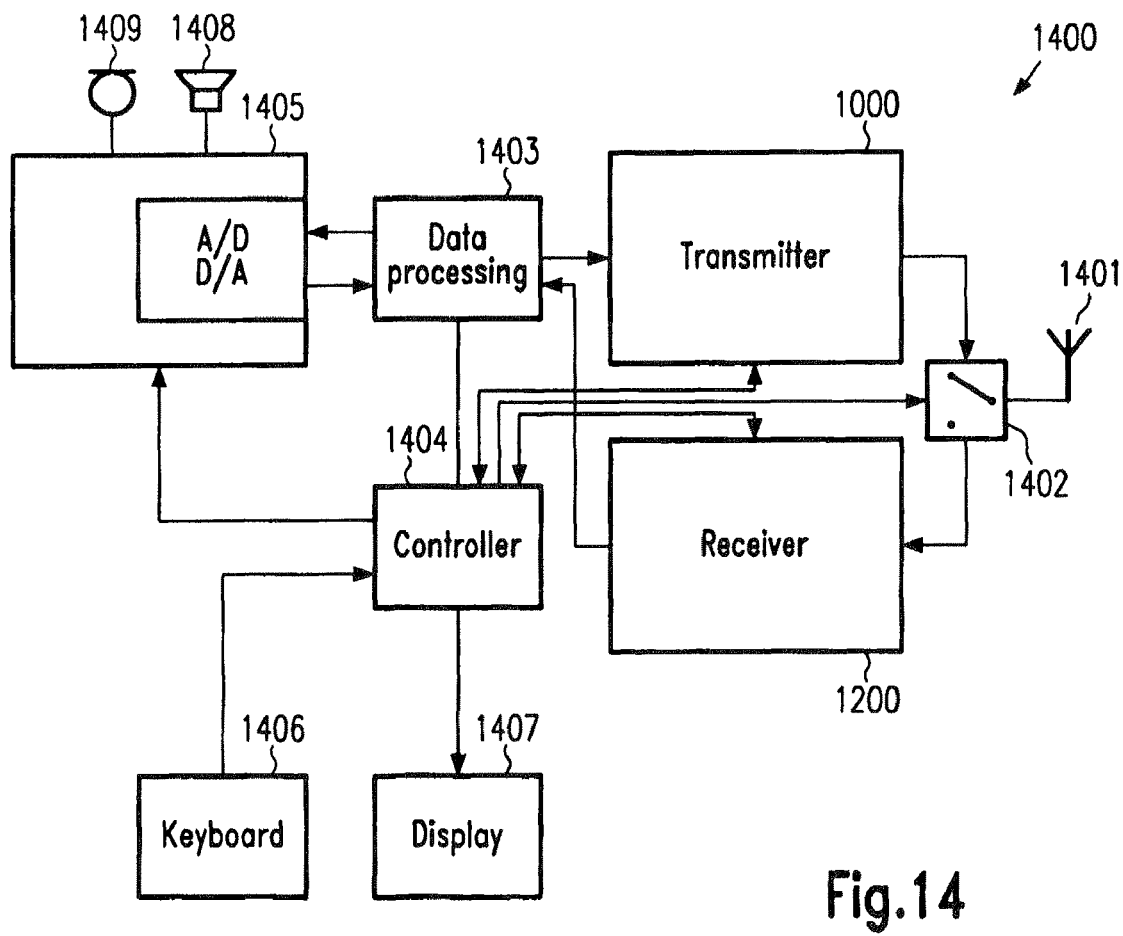
FIG. 14 shows an exemplary block schematic of a mobile station.

A counterpart to base station 1300 might be a mobile station 1400 as shown in FIG. 14. Besides transmitter 1000 and receiver 1200, a mobile station may further comprise antenna 1401, antenna switch 1402, data processing unit 1403 and controller 1404.

Mobile station 1400 might be a mobile phone or a module to be integrated into a portable computer, PDA, vehicle, vending machine or the like. A mobile phone may further comprise mixed signal unit 1405 and a user interface comprising keyboard 1406, display 1407, speaker 1408 and microphone 1409.

The present invention advantageously allows improved channel estimation with reduced loss of data transmission capacity compared to the use of pilot signals. Furthermore it allows to adapt the necessary trade-off for transmission capacity to the requirements of the transmission channel by choosing different grades of ambiguity reduction.

While the invention has been described with respect to the embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas with which it is believed that those of ordinary skill in the art are familiar, have not been described herein in order to not unnecessarily obscure the invention described herein. Specifically, it should be apparent to those skilled in the art that the methods and apparatus that have been mainly described to be applicable in time domain for a time-selective radio environment may be applicable to any other domain that exhibits selective behaviour. Furthermore, when quasi-pilot symbols are used it may be unnecessary to use pilot symbols at all. Accordingly, it is to be understood that the invention is not to be limited by the specific illustrative embodiments, but only by the scope of the appended claims.

The invention claimed is:

1. A method for transmitting signals in a communication system, comprising the steps of
   determining a first modulation scheme;
   determining at least one position for the transmission of quasi-pilot symbols in a data transmission stream;
   determining at least one further modulation scheme, having a smaller number of amplitude or phase ambiguities than the first modulation scheme, for modulation of data in the quasi-pilot symbols;
   transmitting data in the communication system according to the at least one further modulation scheme at the determined position for the quasi-pilot symbols;

transmitting data in the communication system according to the first modulation scheme at other symbol positions within the data transmission stream;

wherein the at least one further modulation scheme has a lower number of modulation states than the first modulation scheme, the method further comprising the steps of:

selecting a modulation scheme having more modulation states than the first modulation scheme;

transmitting a quasi-pilot symbol using the modulation scheme that has the lower number of modulation states than the first modulation scheme, thereby replacing an original data symbol; and transmitting bits from the original data symbol replaced by the quasi-pilot symbol together with bits of another data symbol, using said selected modulation scheme having more modulation states than the first modulation scheme.

2. The method according to claim 1, wherein the at least one further modulation scheme does not have amplitude ambiguity.

3. The method according to claim 1, wherein the at least one further modulation scheme does not have phase ambiguity.

4. The method according to claim 1, wherein the at least one further modulation scheme comprises at least two further modulation schemes and at least one of the at least two further modulation schemes has a lower amplitude ambiguity than the first modulation scheme and at least one of the at least two further modulation schemes has a lower phase ambiguity than the first modulation scheme.

5. The method according to the claim 1, wherein, in said step of determining the at least one further modulation scheme, a reduction of amplitude and/or phase ambiguities of said at least one further modulation scheme in comparison to said first modulation scheme is achieved depending on existing or expected properties of a channel on which the data is transmitted.

6. The method according to claim 1, wherein the at least one further modulation scheme comprises a plurality of further modulation schemes for a plurality of quasi-pilot symbols, and at least a part of the plurality of further modulation schemes is determined dynamically based on properties of a channel of a digital communication system in which the signals are transmitted.

7. The method according to claim 1, wherein the at least one further modulation scheme has the same number of modulation states as the first modulation scheme.

8. The method according to claim 1, wherein the at least one further modulation scheme has a lower number of modulation states than the first modulation scheme and data to be transmitted with the respective quasi-pilot symbol is punctured to adjust the amount of data to be transmitted to the number of modulation states.

9. The method according to claim 1, wherein the first modulation scheme comprises 2n modulation states and the at least one further modulation scheme comprises 2m modulation states with m<n, wherein m and n are positive integers greater than 0, the method further comprising the steps of:

selecting a modulation scheme having 2n−m modulation states; and transmitting n−m bits of the original data symbol replaced by the quasi-pilot symbol together with n bits of a data symbol as a modified data symbol using said modulation scheme having 2n−m modulation states.

10. The method according to claim 1, wherein the first modulation scheme comprises 2n modulation states and the at least one further modulation scheme comprises 2m modulation states with m<n, wherein m and n are positive integers greater than 0 the method further comprising the steps of:

selecting a modulation scheme having 2n+1 modulation states;

transmitting a quasi-pilot symbol using the at least one modulation scheme with 2m modulation states, thereby replacing an original data symbol having n bits; and transmitting n−m bits of the original data symbol replaced by the quasi-pilot symbol, each one together with n bits of a data symbol as modified data symbols using said modulation scheme having 2n+1 modulation states.

11. The method according to claim 1, wherein quasi-pilot symbol positions are spaced equidistantly in the data transmission stream in at least one of the data transmission domains.

12. The method according to claim 1, further comprising the steps of transmitting pilot symbols at determined symbol positions within the data transmission stream.

13. The method according to claim 12, wherein pilot symbol positions and quasi-pilot symbol positions are spaced equidistantly in the data transmission stream in at least one of the data transmission domains.

14. The method according to claim 1 wherein quasi-pilot symbol positions are determined in groups of at least two adjacent symbol positions with respect to at least one of the data transmission domains, and the groups of quasi-pilot symbol positions are spaced equidistantly in the data transmission stream in said at least one data transmission domain.

15. The method according to claim 1, wherein a plurality of quasi-pilot symbols is transmitted in adjacent symbol positions.

16. A non-transitory computer-readable data storage medium, having stored thereon program instructions, which, when executed on a processor of a data transmitter, cause the data transmitter to perform the method of claim 1.

17. A data transmitter for a communication system, comprising: means for determining a first modulation scheme;

means for determining at least one position for the transmission of quasi-pilot symbols in a data transmission stream;

means for determining at least one further modulation scheme, having a smaller number of amplitude or phase ambiguities than the first modulation scheme, for modulation of data in the quasi-pilot symbols;

modulation means, configured to modulate data onto a carrier according to the at least one further modulation scheme at the determined position for the quasi-pilot symbols, and to modulate data onto the same carrier according to the first modulation scheme at other symbol positions within the data transmission stream;

wherein the at least one further modulation scheme has a lower number of modulation states than the first modulation scheme, the data transmitter further comprising:

means for selecting a modulation scheme having more modulation states than the first modulation scheme;

means for transmitting a quasi-pilot symbol using the modulation scheme that has the lower number of modulation states than the first modulation scheme, thereby replacing an original data symbol; and means for transmitting bits from the original data symbol replaced by the quasi-pilot symbol together with bits of another data symbol, using said selected modulation scheme having more modulation states than the first modulation scheme.

18. A base station comprising at least one transmitter according to claim 17.

19. A mobile station comprising at least one transmitter according to claim 17.

20. A method for receiving signals in a communication system, the method comprising the steps of:
- receiving a data transmission stream in which data symbols are modulated according to a first modulation scheme and quasi-pilot symbols in determined positions within frames are modulated according to at least one further modulation scheme having a smaller number of amplitude or phase ambiguities than the first modulation scheme;
- selecting the quasi-pilot symbols according to the determined symbol positions;
- using said quasi-pilot symbols for estimation of transmission channel properties; and
- demodulating and detecting said quasi-pilot symbols, wherein:
- the at least one further modulation scheme has a lower number of modulation states than the first modulation scheme,
- data bits which cannot be transmitted in quasi-pilot symbols due to a reduced number of modulation states are transmitted in other symbols having at least one further modulation scheme with a higher number of modulation states than the first modulation scheme, and
- bits are rearranged between the symbols such that an original order of the bits before substitution of original symbols by the quasi-pilot symbols and said other symbols is restored.

21. The method according to claim 20, comprising a step of averaging results from different quasi-pilot symbols in the estimation of the transmission channel properties.

22. The method according to claim 20 further comprising the step of rearranging bits among the other symbols such that an original order of the bits before replacement of original symbols by the quasi-pilot symbols and other symbols is restored.

23. A non-transitory computer-readable storage medium having stored thereon instructions, which, when executed on a processor of a data receiver, cause the data receiver to perform the method of claim 20.

24. A data receiver for a communication system, configured to receive a data transmission stream in which data symbols are modulated according to a first modulation scheme and quasi-pilot symbols in determined positions within frames are modulated according to at least one further modulation scheme having a smaller number of amplitude or phase ambiguities than the first modulation scheme, the receiver comprising:
- a quasi-pilot controller comprising a processor configured to select the quasi-pilot symbols according to the determined symbol positions;
- a channel estimation unit configured to use said quasi-pilot symbols for estimation of transmission channel properties; and
- a quasi-pilot extraction unit configured to send the quasi-pilot symbols selected by the quasi-pilot controller to the channel estimation unit and at the same time to a unit for demodulation and detection, wherein:
- the at least one further modulation scheme has a lower number of modulation states than the first modulation scheme,
- data bits which cannot be transmitted in quasi-pilot symbols due to a reduced number of modulation states are transmitted in other symbols having at least one further modulation scheme with a higher number of modulation states than the first modulation scheme, and
- bits are rearranged between the symbols such that an original order of the bits before substitution of original symbols by the quasi-pilot symbols and said other symbols is restored.

* * * * *